(12) United States Patent
Hanzlick et al.

(10) Patent No.: US 7,665,691 B2
(45) Date of Patent: Feb. 23, 2010

(54) AERIAL VEHICLE LAUNCHING SYSTEM AND METHOD

(75) Inventors: Patrick T. Hanzlick, Tucson, AZ (US); Joshua J. Lange, Tucson, AZ (US)

(73) Assignee: Raytheon Company, Tucson, AZ (US)

( * ) Notice: Subject to any disclaimer, the term of this patent is extended or adjusted under 35 U.S.C. 154(b) by 262 days.

(21) Appl. No.: 11/679,365

(22) Filed: Feb. 27, 2007

(65) Prior Publication Data
US 2008/0203220 A1     Aug. 28, 2008

(51) Int. Cl.
*B64F 1/10* (2006.01)
(52) U.S. Cl. .......................................... 244/63
(58) Field of Classification Search .................. 244/2, 244/63, 171.4, 171.3; 446/61
See application file for complete search history.

(56) References Cited

U.S. PATENT DOCUMENTS

| | | | | |
|---|---|---|---|---|
| 1,703,488 A | * | 2/1929 | Junkers | 244/63 |
| 1,803,320 A | * | 5/1931 | Christianson | 244/63 |
| 2,242,628 A | * | 5/1941 | Taylor, Jr. | 244/63 |
| 2,659,553 A | * | 11/1953 | Wallis | 244/63 |
| 2,774,557 A | * | 12/1956 | Jakimiuk et al. | 244/63 |
| 2,921,756 A | * | 1/1960 | Borden et al. | 244/2 |
| 5,150,860 A | * | 9/1992 | Young | 244/63 |

FOREIGN PATENT DOCUMENTS

EP      141672 A1  *  5/1985

* cited by examiner

*Primary Examiner*—Michael R Mansen
*Assistant Examiner*—Michael Kreiner
(74) *Attorney, Agent, or Firm*—Schwegman, Lundberg & Woessner, P.A.; Gregory Gorrie (57) ABSTRACT

An aerial vehicle launching system includes a launch platform and a restraint system coupled to the launch platform. The restraint system has at least one passive restraint suitably adapted to indirectly restrain an aerial vehicle. The restraint system is configured to coordinate the uniform retention and release of the passive restraint in order to launch the aerial vehicle.

21 Claims, 7 Drawing Sheets

AERIAL VEHICLE LAUNCHING SYSTEM AND METHOD

FIELD OF THE INVENTION

The present invention generally concerns systems and methods for launching aerial vehicles; and more particularly, representative and exemplary embodiments of the present invention generally relate to systems, devices and methods for launching unmanned aerial vehicles (UAVs).

BACKGROUND OF INVENTION

Aerial vehicles, particularly smaller unmanned aerial vehicles (UAVs), often face problems due to wind gusts, foreign object damage (FOD), and other risk factors inherent in rolling takeoffs. These risks are especially significant in situations where the propeller of the UAV has a low ground clearance and where there are loose rocks and other debris on the runway surface.

Since it is often difficult, costly, or otherwise impractical to redesign an aircraft to have a higher propeller clearance from the ground and/or to remove all debris from a runway surface, one conventional solution to address risks associated with traditional rolling takeoffs is to implement a launch system for the aerial vehicle. Existing UAV launching systems include both stationary and moving platforms that directly restrain the UAV and then impart a force to launch the UAV. In theory, such launch systems generally provide a stable platform for the UAV to launch, and can shield and/or mitigate the risk of harm to the UAV from FOD, wind gusts, and other factors. However, conventional launching systems and methods present a number of significant disadvantages.

One disadvantage for a directly restrained UAV is that there may not be suitable structural hard-points on the UAV for such a system to operate properly. For example, hard-point attachment sites on the aircraft may not have sufficient structural integrity to resist the shock of a launch from a launches without failing and causing the aircraft to be damaged. Another disadvantage of conventional systems is that they may be unable to prevent significant transient movements after release of the aircraft from the launcher, which can result in faulty launch of the vehicle.

Yet another disadvantage is that conventional launch systems can transfer/impart shock, thereby damaging the aircraft or its control systems; particularly when the aircraft is attached to the launch system via its wings or other relatively delicate control surfaces. Another disadvantage is that conventional launch systems can transfer/impart vibration, thereby damaging or affecting an aircraft's sensors, navigation systems, electronics, or other avionics. Still another disadvantage is that the propeller of the UAV may not have sufficient clearance with respect to the launch system. Yet another disadvantage is that a substantially direct connection between the restrained device and the restraining device may result in the two binding and preventing their decoupling during a launch.

Many conventional launch systems have been specifically customized for launching a single type of UAV. Consequently, it is often expensive and impractical to launch UAVs of varying configurations using existing launch systems, since each aircraft would require a dedicated launch system. Furthermore, conventional launch systems are often hindered by heavy aerial vehicle weights and the need for variable takeoff speeds depending on weather conditions.

Accordingly, there is a need for an apparatus and method to launch an aerial vehicle that overcomes these and other deficiencies associated with the conventional art.

SUMMARY OF THE INVENTION

In various representative aspects, the present invention provides a system and method for launching an aerial vehicle. Exemplary features generally include a restraint system attached to a launch platform. The restraint system generally comprises at least one passive restraint suitably adapted to indirectly restrain an aerial vehicle, where the restraint system is generally configured to coordinate the substantially uniform retention and release of the passive restraint in order to launch the aerial vehicle.

Advantages of the present invention will be set forth in the Detailed Description which follows and may be apparent from the Detailed Description or may be learned by practice of exemplary embodiments of the invention. Still other advantages of the invention may be realized by means of any of the instrumentalities, methods or combinations particularly pointed out in the claims.

BRIEF DESCRIPTION OF THE DRAWINGS

Representative elements, operational features, applications and/or advantages of the present invention reside inter alia in the details of construction and operation as more fully hereafter depicted, described and claimed—reference being made to the accompanying drawings forming a part hereof, wherein like numerals refer to like parts throughout. Other elements, operational features, applications and/or advantages will become apparent in light of certain exemplary embodiments recited in the detailed description, wherein:

Elements in the figures are illustrated for simplicity and clarity and have not necessarily been drawn to scale. For example, the dimensions of some of the elements in the figures may be exaggerated relative to other elements to help improve understanding of various embodiments of the present invention. Furthermore, the terms "first", "second", and the like herein, if any, are used inter alia for distinguishing between similar elements and not necessarily for describing a sequential or chronological order. Moreover, the terms "front", "back", "top", "bottom", "over", "under", "forward", "aft", and the like in the Description and/or in the claims, if any, are generally employed for descriptive purposes and not necessarily for comprehensively describing exclusive relative position. Any of the preceding terms so used may be interchanged under the appropriate circumstances such that various embodiments of the invention described herein, for example, may be capable of operation in other configurations and/or orientations than those explicitly illustrated or otherwise described.

DETAILED DESCRIPTION OF EXEMPLARY EMBODIMENTS

The following representative descriptions of the present invention generally relate to exemplary embodiments and the inventors' conception of the best mode, and are not intended to limit the scope, applicability or configuration of the invention in any way. Rather, the following description is intended to provide convenient illustrations for implementing various embodiments of the invention. As will become apparent, changes may be made in the function and/or arrangement of any of the elements described in the disclosed exemplary embodiments without departing from the spirit and scope of the invention.

Various representative implementations of the present invention may be applied to any system for launching aerial vehicles. It will be appreciated that additional features may be readily adapted, extended, or otherwise applied to future vehicle launching system designs. Accordingly, it will be further understood that the present invention is more generally directed to the generic conceptual approach of implementing an aerial vehicle launching system rather than merely disclosing specific module designs and/or combinatorial permutations.

As used herein, the terms "Unmanned Aerial Vehicle (UAV)", "aerial vehicle", "launch vehicle", "aircraft", or any variation or combination thereof, are generally intended to include anything that may be suitably launched from an aerial vehicle launching system, such as, for example, an aircraft, a missile, a waterborne vehicle, a spacecraft, a guided bomb, and/or the like. A detailed description of an exemplary application, namely a launching system for aerial vehicles, is provided as a specific enabling disclosure that may be generalized to any application of the disclosed system, device and method for launching aerial vehicles in accordance with various embodiments of the present invention.

Figure 1:
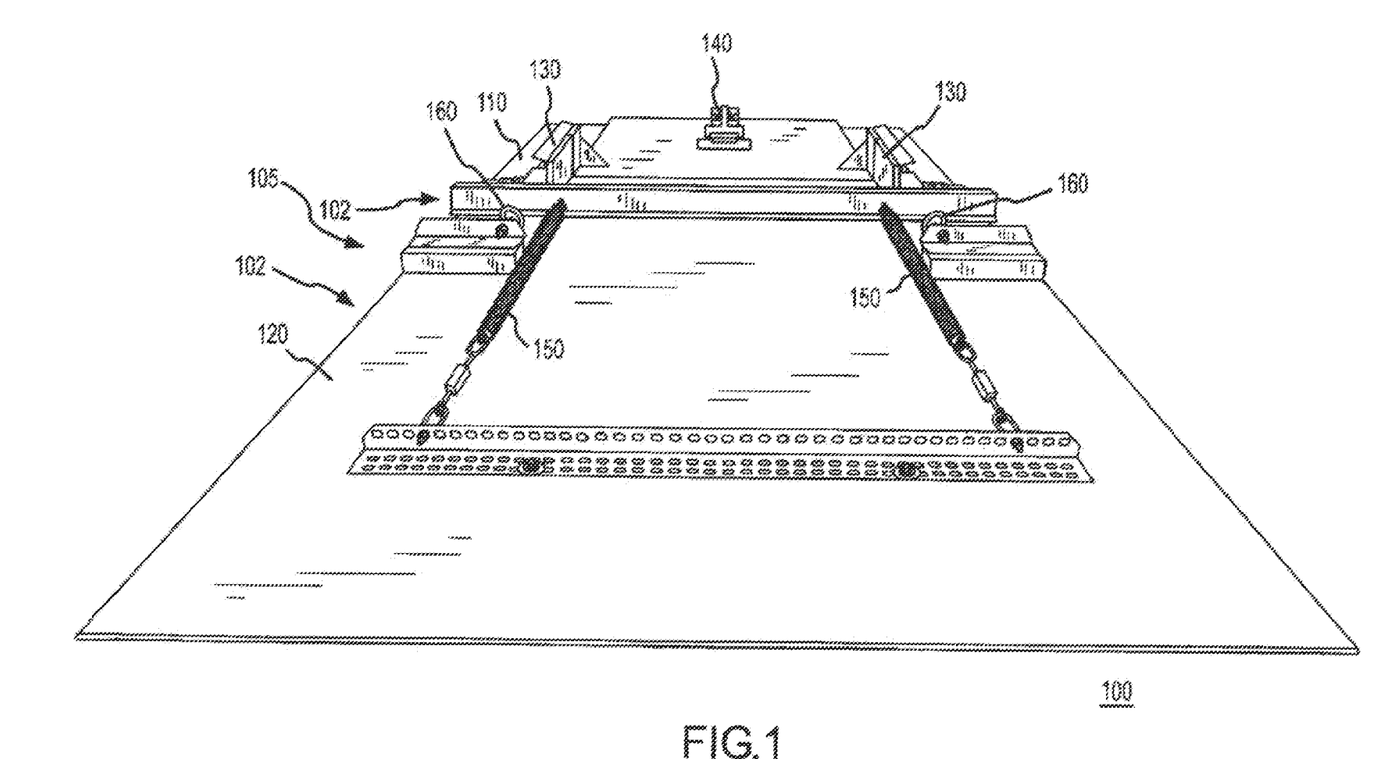
FIG. 1 representatively illustrates a top perspective view of an aerial vehicle launching system in accordance with an exemplary embodiment of the present invention.

FIG. 1 representatively illustrates a top perspective view of an aerial vehicle launching system 100 in accordance with an exemplary embodiment of the present invention. As generally depicted in FIG. 1, an exemplary aerial vehicle launching system 100 may include a launch platform 105 comprising a glide drawer 102 having a first section 110 coupled with and overlapped by a second section 120. Coupled to the first section 110 are retention rails 130 and a tensioned nose gear lever 140 that together comprise passive restraints. The first section 110 and second section 120 may be coupled via at least one torsion spring 150.

A passive restraint may comprise any type of restraint that indirectly restrains an aerial vehicle to the launch platform 105. Passive restraints may restrain via the application of a downward force to restrain the aerial vehicle through friction as opposed to actively/directly restraining through the application of tie-downs to hard points on the aerial vehicle, or any other means of directly anchoring the aerial vehicle. A passive restraint may also include any means of restraining the aerial vehicle by limiting the motion of a portion of the aerial vehicle (for example the landing gear) via guides, where the guides do not directly anchor the aerial vehicle to the launch platform 105.

The launch platform 105 provides a base from which an aerial vehicle may be launched. The launch platform 105 may be implemented in any suitable manner, and may comprise any suitable materials. The launch platform 105 may be of any suitable size, shape, configuration, geometry, and symmetry and may include any suitable systems, devices, structures, and/or features to achieve any particular purpose. For example, in an exemplary embodiment, the launch platform 105 includes a rectangular first section 110 and a rectangular second section 120 whose movement and positioning acts to restrain and release the aerial vehicle. The first section 110 and second section 120 may comprise platforms coupled together via at least one torsion spring 150 and at least one retention rail 130. The movement of the first section 110 and the second section 120 may also suitably be restricted by bumpers 160 that prevent the torsion spring 150 from overextending the first section 110 and the second section 120.

Figure 2:
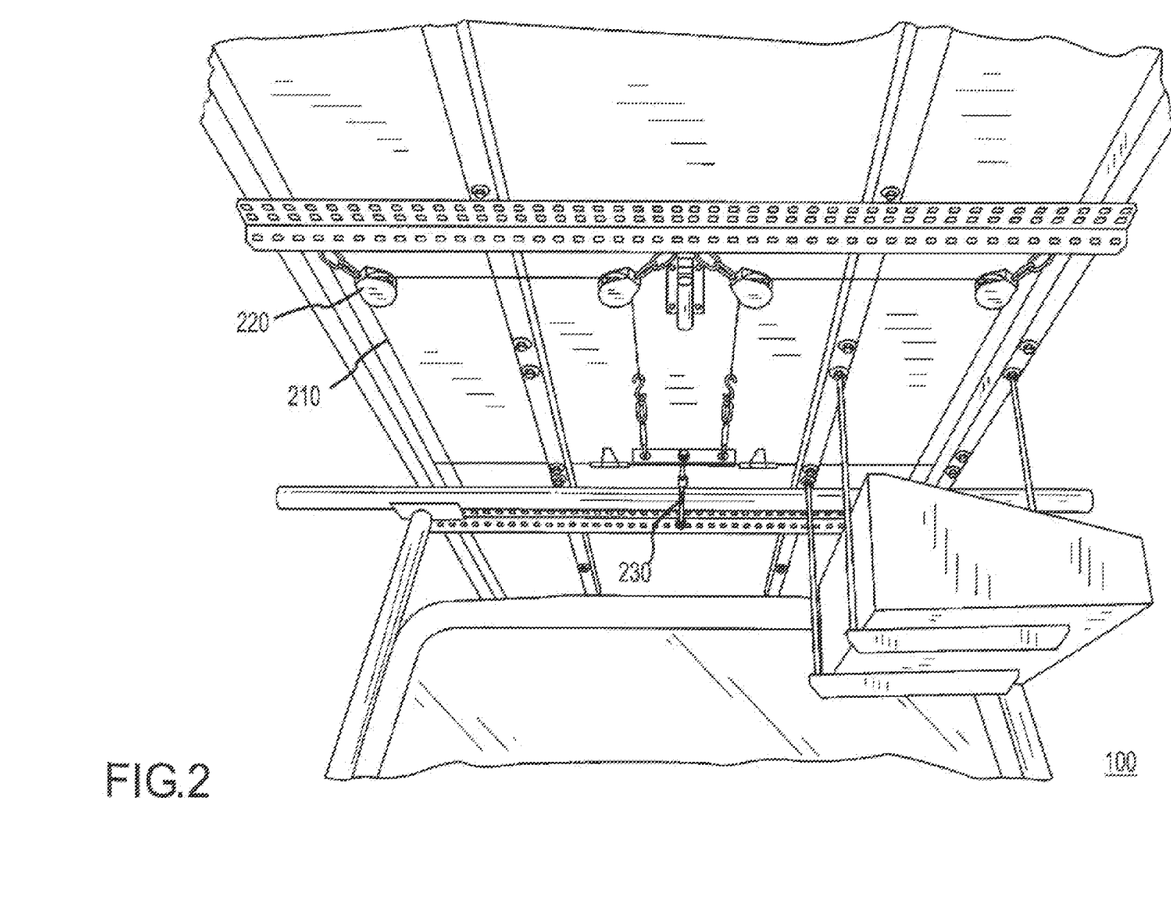
FIG. 2 representatively illustrates an underside perspective view of the aerial vehicle launching system generally depicted in FIG. 1, in accordance with an exemplary embodiment of the present invention.

FIG. 2 representatively illustrates an underside view of an aerial vehicle launching system 100 generally depicted in FIG. 1. As first section 110 and second section 120 of glide drawer 102 are extended apart from each other to engage one or more passive restraints on the aerial vehicle, the torsion spring 150 may be extended and a load may be placed on the torsion spring 150. The position of the first section 110 and the second section 120 may be effected and maintained by any suitable system, structure, and/or device, such as by a system of cables 210 and pulleys 220 held in place via a trigger assembly 230. When the trigger assembly 230 is released, the torsion spring 150 is allowed to contract and pull the first section 110 and second section 120 together, releasing the passive restraints on the aerial vehicle and allowing it to launch.

Figure 3:
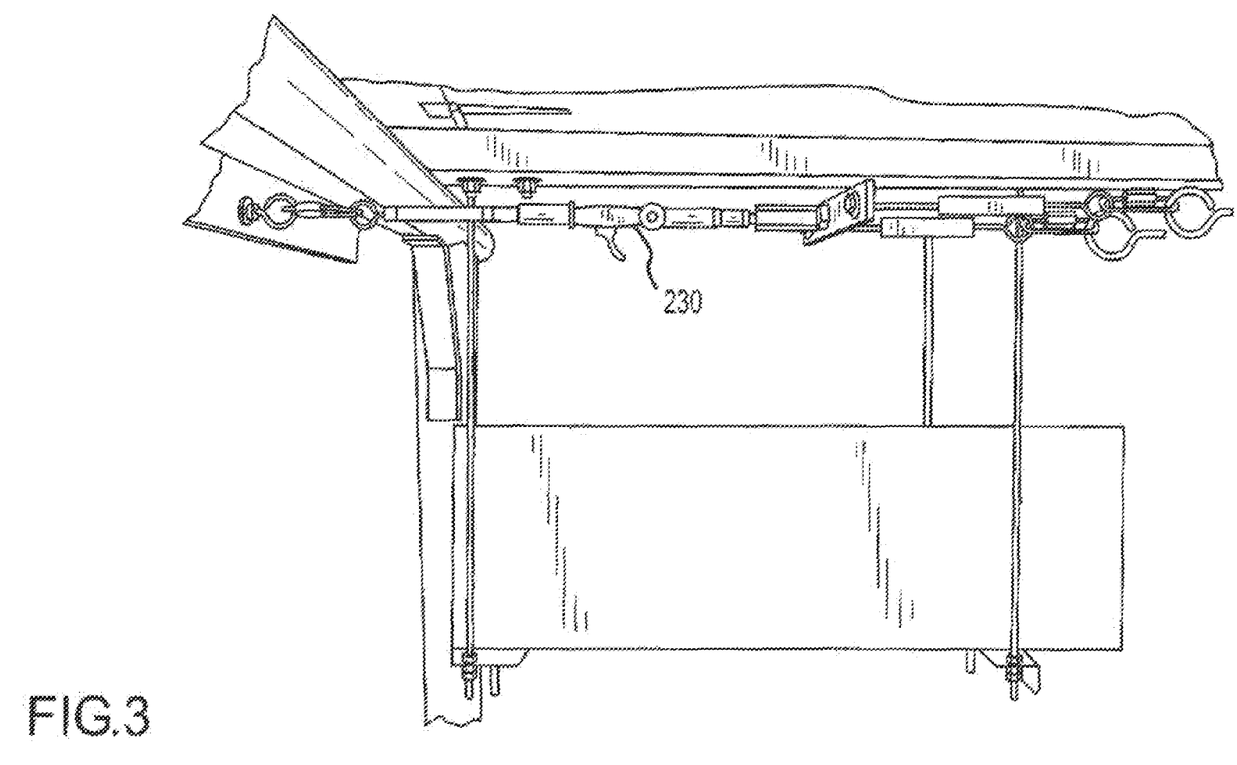
FIG. 3 representatively illustrates a side perspective view of a trigger release assembly for an aerial vehicle launching system in accordance with an exemplary embodiment of the present invention.

FIG. 3 representatively illustrates a side view of a trigger assembly 230 for an aerial vehicle launching system 100 in accordance with an exemplary embodiment of the present invention. The release of cables 210 is controlled through trigger assembly 230, which allows the torsion spring 150 to contract, drawing the first section 110 and second section 120 of glide drawer 102 sections together. Trigger assembly 230 may comprise any means for maintaining tension on the system of cables 210 such that first section 110 and second section 120 are maintained in a position to passively restrain an aerial vehicle. For example, trigger assembly 230 may be a mechanical lever with a latching mechanism that may be latched and/or released via manual action, mechanical means, electrical means, hydraulic means, and/or the like.

Figure 4:
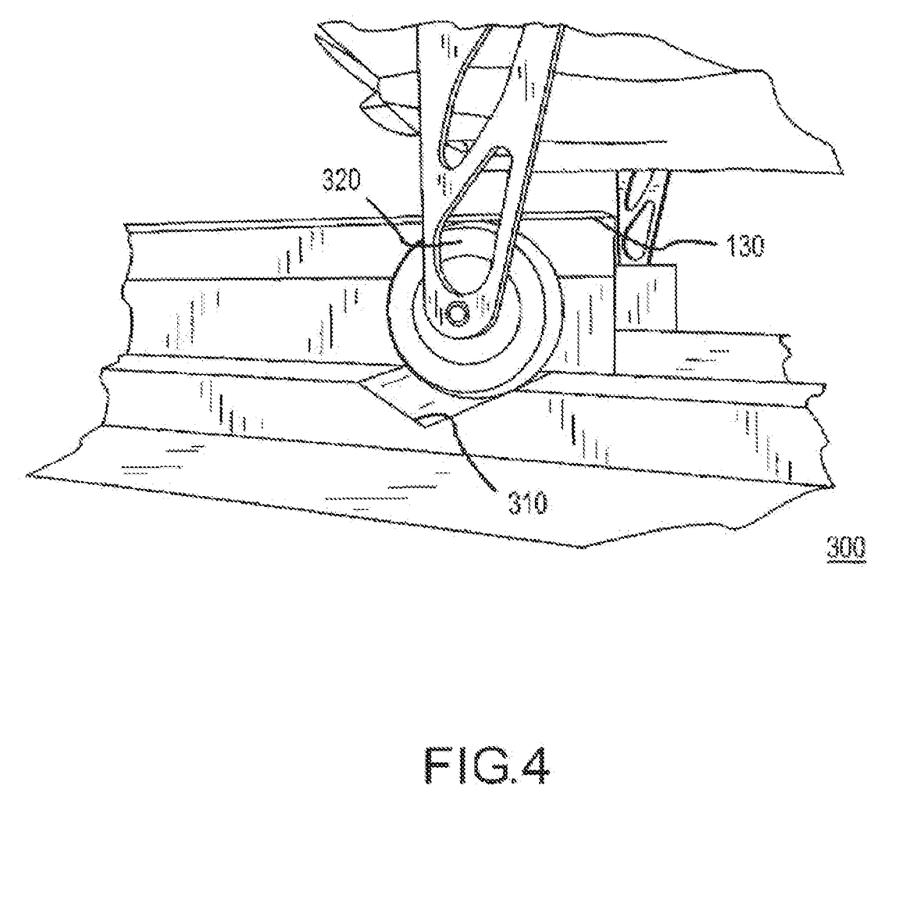
FIGS. 4, 5, and 6 representatively illustrate elements of a restraint system for an aerial vehicle launching system in accordance with exemplary embodiments of the present invention.
Figure 5:
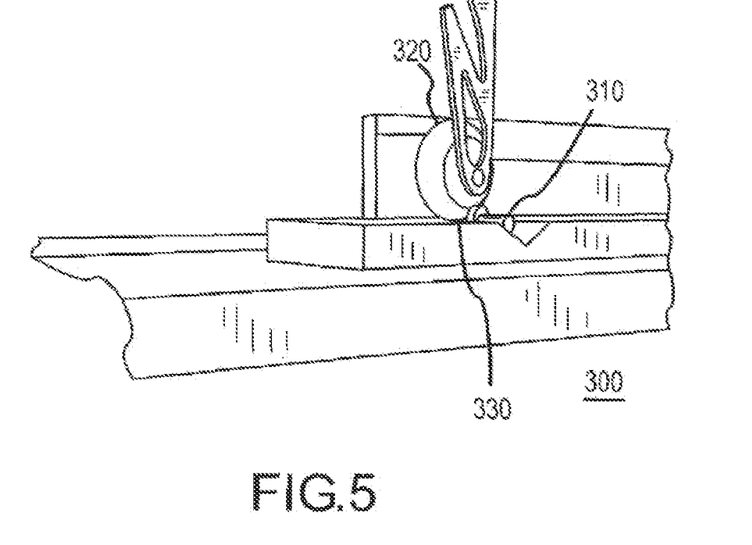
Figure 6:
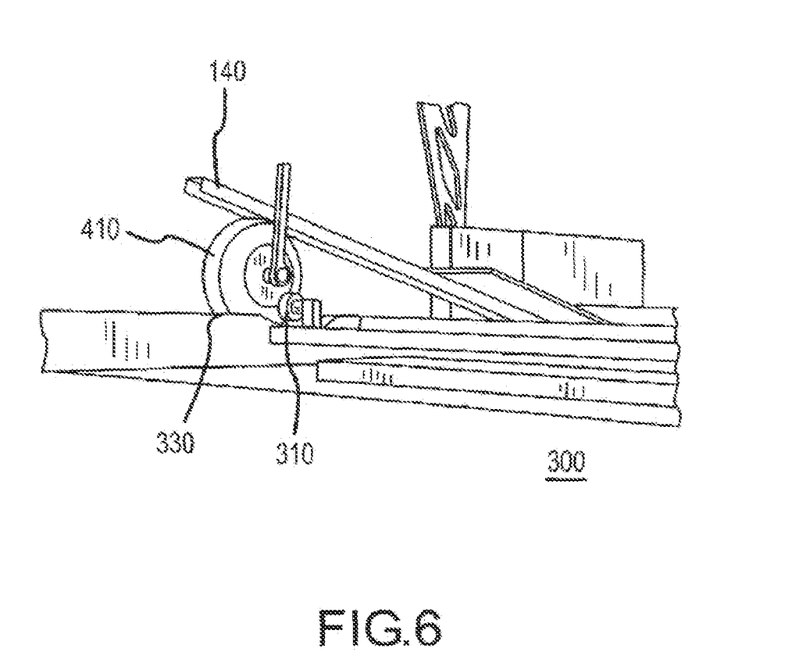

FIGS. 4, 5, and 6 representatively illustrate elements of a restraint system 300 for an aerial vehicle launching system 100 in accordance with exemplary embodiments of the present invention. Launch platform 105 includes restraint system 300 suitably configured to passively restrain an aerial vehicle. The launch platform 105 may include any suitable number of restraint systems 300 of any suitable size, shape, configuration, geometry, and/or symmetry. The restraint system 300 may also interact with any other suitable structures, systems and/or devices to achieve any particular purpose.

As depicted in FIGS. 4 and 5, restraint system 300 includes passive restraints, for example wheel chock notch 310, wheel guide 330 and retention rail 130, to passively restrain a main gear 320 of an aerial vehicle. Wheel check notch 310 and wheel guide 330 may be included, for example, on second section 120 of glide drawer 102. Retention rail 130 may be included, for example, on first section 110 of glide drawer 102. At least one wheel chock notch 310, wheel guide 330 and at least one retention rail 130 may be included for each main gear 320 of aerial vehicle, where main gear 320 may comprise at least one wheel, skid plate, pontoon, and/or the like, that provides support for the aerial vehicle when in a stationary configuration. In a representative embodiment, retention rail 130 includes a bracket, for example an L-bracket, that acts to limit the vertical motion of the aerial vehicle. Wheel guide 330 acts to restrain the side motion of the main gear 320 and may be made of any suitable material, for example nylon, and the like.

Referring now to FIG. 6, passive restraints may include a wheel chock notch 310 and a tensioned nose gear lever 140 to passively restrain the nose gear 410 of an aerial vehicle. Nose gear 410 may comprise at least one wheel, skid plate, pontoon, and/or the like, that provides support for the aerial vehicle when in a stationary configuration. Tensioned nose gear lever 140 may be spring loaded to provide at least one of a downward force and/or a frictional force on nose gear 410. Additionally, the side motion of the nose gear 410 may be restrained by one or more wheel guides 330.

The passive restraints of restraint system 300 on launch platform 105 suitably limit the aerial vehicle's movement within a specified volume. In an representative and exemplary embodiment, for example, the positioning of the retention rails 130 in relation to the wheel chock notches 310 define a volume within which the main gear 320 may float but not escape restraint. In the representatively disclosed embodiment, the retention rail 130 restrains the upward motion of the main gear 320, while the wheel chock notches 310 restrain forward and downward motion, and the wheel guide 330 restrains side motion of the main gear 320. Similarly, the upward motion of the nose gear 410 is restrained by the tensioned nose gear lever 140, while the wheel chock notch 310 restrain forward, backward and downward motion, and the wheel guide 330 restrain side motion of the nose gear 410. It is noted that none of the passive restraints operate to directly restrain the aerial vehicle via tie-downs, aerial vehicle hard points, or the like.

The passive restraints of restraint system 300 may operate to restrain an aerial vehicle in any suitable manner to achieve any particular purpose, such as to absorb and deflect various forces and shocks associated with launching the aerial vehicle in order to prevent such forces from affecting the aerial vehicle. The restraint systems may absorb and deflect any force from any source in any suitable manner, for example, external forces applied to the launch platform 105 prior to launch of the aerial vehicle.

In an exemplary embodiment, the retention rails 130 work in conjunction with the wheel chock notches 310 and the wheel guides 330 to limit the degree of movement between the launch platform 105 and the aerial vehicle in order to prevent transient forces and transient movement from altering the aerial vehicle's facing and/or momentum, thereby causing a faulty launch.

Additionally, the tensioned nose gear lever 140 may be suitably configured to allow the nose gear 410 to pitch up slightly in order to prevent the structure of the nose gear 410 from being damaged when the aerial vehicle launching system 100 experiences a sudden shock. For example, since the tensioned nose gear lever 140 is spring actuated, transient forces and movement of the aerial vehicle may be allowed, while limiting these transient forces and movement to any desired value by adjusting the spring tension in tensioned nose gear lever 140.

The restraint system 300 on the launch platform 105 may be suitably configured to substantially uniformly release the aerial vehicle. The restraint system 300 may be suitably adapted to allow the aerial vehicle to be launched without binding and/or colliding with the structure of the aerial vehicle launching system 100. In the present embodiment, for example, the tensioned nose gear lever 140 drops down to the level of the first section 110 of the glide drawer 102 as the retention rails 130 and tensioned nose gear lever 140 are retracted, thus simultaneously removing the restrains on the aerial vehicle and allowing it to launch. The tensioned nose gear lever 140 dropping to the surface of the first section 110 also prevents tensioned nose gear lever 140 from colliding with the propeller of the aerial vehicle.

The launch platform 105 is suitably adapted to allow the aerial vehicle to launch upon the aerial vehicle reaching a prescribed launch velocity, which may comprise any specified velocity that permits aerial vehicle to launch either under its own power or with the assistance of a launching force.

Figure 7:
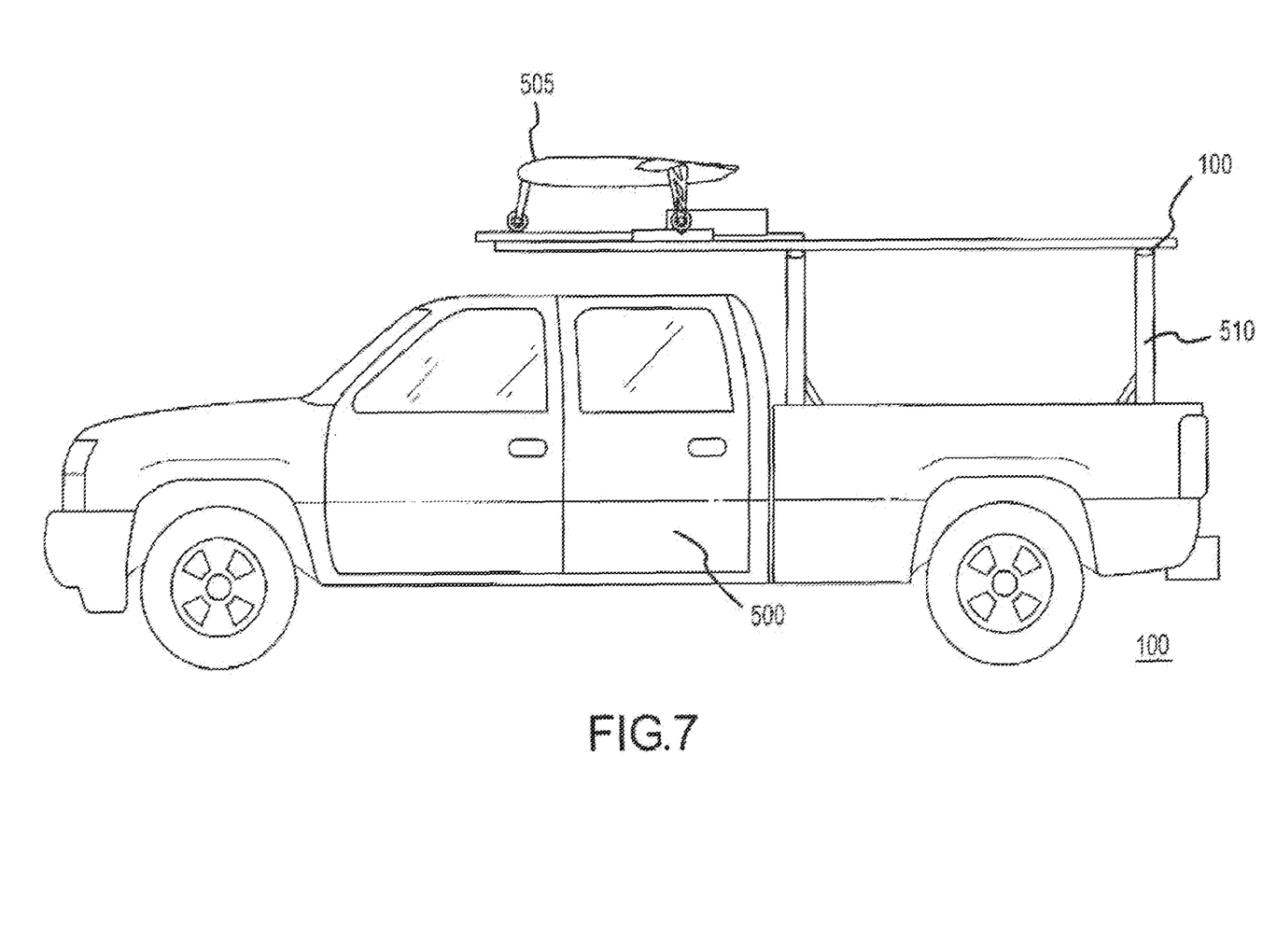
FIG. 7 representatively illustrates a side view of an aerial vehicle launching system (including an attached vehicle fuselage for subsequent launch) in accordance with an exemplary embodiment of the present invention.

FIG. 7 representatively illustrates a side view of an aerial vehicle launching system 100 including a propulsion vehicle 500 in accordance with an exemplary embodiment of the present invention. In this embodiment, launch platform 105 may be mounted on a propulsion vehicle 500 using a mounting rack 510. In a representative aspect, mounting rack 510 may comprise any structure suitably adapted to anchor and/or support launch platform 105 on propulsion vehicle 500. For example, mounting rack 510 may comprise any combination of metal, wood and/or composite structural support members suitably configured to anchor and support launch platform 105.

The aerial vehicle launching system 100 may be brought to any desired practical velocity and the propulsion vehicle 500 may transport the launch platform 105 in any suitable manner. For example, the velocity needed to launch an aerial vehicle 505 may be significantly higher in hot weather than in cooler weather.

Propulsion vehicle 500 may comprise any suitable vehicle, system, and/or device. For example, propulsion vehicle 500 may comprise an automobile, boat, aircraft, spacecraft, and/or the like. In a representative embodiment, the propulsion vehicle 500 accelerates the aerial vehicle 505, substantially uniformly restrained by restraint system 300, to a suitable velocity. Once the target launch velocity is achieved, the passive restraints are released from the aerial vehicle 505 allowing it to take off.

Figure 8:
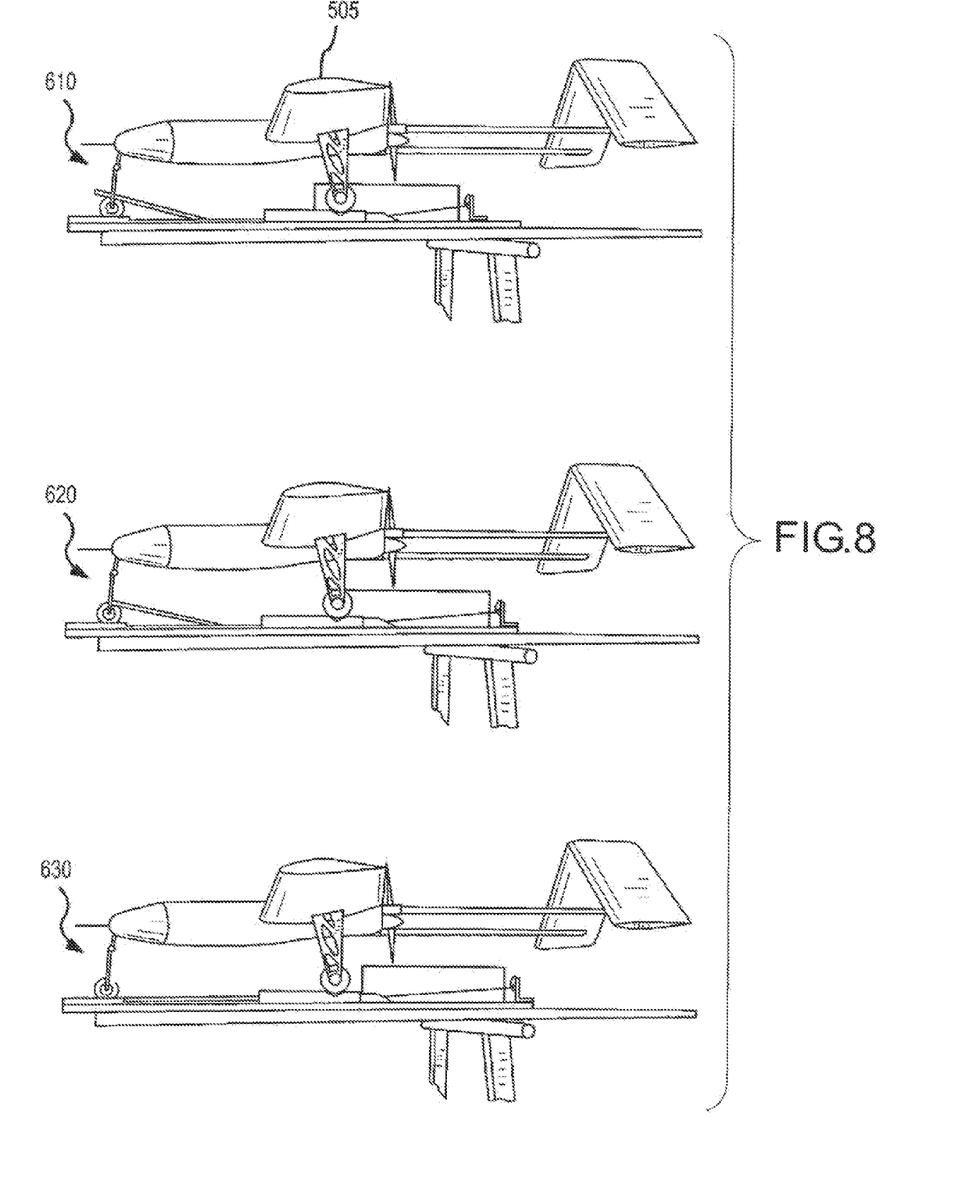
FIG. 8 representatively illustrate side perspective view generally depicting the operation of an aerial vehicle launching system in accordance with an exemplary embodiment of the present invention.

FIG. 8 representatively illustrates the operation of an aerial vehicle launching system 100 in accordance with an exemplary embodiment of the present invention. As generally depicted in FIG. 8, aerial vehicle launching system 100 passively restrains an aerial vehicle's landing gear (610). In effect, restraint system 300 substantially uniformly restrains aerial vehicle 505. When the aerial vehicle launching system reaches a suitable velocity, the positive restrains begin to retract (620). Once the passive restrains have been removed from the aerial vehicle (630), the aerial vehicle is uniformly released and may launch. In the embodiment representatively depicted in FIG. 8, a launch mechanism to provide a launching force to the aerial vehicle 505 may not be necessary. Furthermore, the restraint system 300, in particular the tensioned nose gear lever 140 and retention rails, are clear of the aerial vehicle 505 and the propeller during launch.

Launching an aerial vehicle 505 from the aerial vehicle launching system 110 may include the aerial vehicle 505 generating thrust to overcome static retention features of the aerial vehicle launching system 100. For example, the wheel chock notches 310 statistically retain the aerial vehicle 505 even after other passive restraints are removed in order to prevent the aerial vehicle 505 from prematurely disengaging the aerial vehicle launching system 100. This may require the aerial vehicle 505 to generate enough excess thrust with respect to the aerial vehicle launching system 100 in order to launch.

Any suitable amount of thrust may be employed in order to launch the aerial vehicle 505. For example, the excess thrust required to launch the aerial vehicle 505 and overcome the static restraint of the wheel chock notches 310 may be suitably generated by the engine and the lift generated by the wings of the aerial vehicle 505 as it attains a suitable launch velocity. The excess thrust ($T_{excess, required}$) required to overcome the static restraints by the aerial vehicle 505 may be derived in accordance with the following:

$$T_{engine} > F_{drag} + T_{x, chock}$$

where ...

$T_{engine}$=thrust of the engine;

$F_{drag}$=drag force on the aerial vehicle; and $F_{x, chock}$=static force of wheel chock notches, ($F_{x, chock} = W_{eff} * \sin(\theta)$).

$W_{eff}$=effective weight of UAV ($W_{TO} - F_L$)

where ...

$W_{TO}$=takeoff weight (static);

$F_L$=lift force; and

θ=inclination angle of chocks (e.g., 30 deg).

$$T_{excess, required} > 0.5 * W_{eff}$$

$T_{excess, required} \rightarrow 0$, as $F_L \rightarrow W_{TO}$

The propulsion vehicle 500 generally permits the aerial vehicle 505 to be launched from any suitable surface and through any suitable medium. For example, the propulsion vehicle 500 may comprise a truck which allows the aerial vehicle 505 to be launched from the launch platform 105 from unprepared to semi-prepared airfields. In another exemplary embodiment, a propulsion vehicle 500 may comprise a waterborne vessel, which accelerates an aerial vehicle 505 to a suitable launch velocity. In yet another exemplary embodiment, the propulsion vehicle 500 may comprise a space vehicle suitable adapted, for example, to release a satellite.

The propulsion vehicle 500 may also perform any other suitable purpose, such as sheltering, storing, and/or transporting the aerial vehicle 505. For example, the propulsion vehicle 500 may protect the aerial vehicle 505 from foreign object damage (FOB) and wind gusts by transporting the aerial vehicle 505 above the surface of an airfield. The propulsion vehicle 500 may be configured to accommodate varying features of aerial vehicles, such as varying weights, sizes, and/or configurations of vehicles. In other words, launch system 100 may accommodate any number of aerial vehicle configurations and need not be limited launching an aerial vehicle having limited configuration options.

In the foregoing specification, the invention has been described with reference to specific exemplary embodiments; however, it will be appreciated that various modifications and changes may be made without departing from the scope of the present invention as set forth in the claims below. The specification and figures are to be regarded in an illustrative manner, rather than a restrictive one and all such modifications are intended to be included within the scope of the present invention. Accordingly, the scope of the invention should be determined by the claims appended hereto and their legal equivalents rather than by merely the examples described above.

For example, the steps recited in any method or process claims may be executed in any order and are not limited to the specific order presented in the claims. Additionally, the components and/or elements recited in any apparatus claims may be assembled or otherwise operationally configured in a variety of permutations to produce substantially the same result as the present invention and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprising", "having", "including", or any contextual variant thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing form the general principles of the same.

We claim:

1. An aerial vehicle launching system comprising:
   a launch platform having a glide drawer with a first section and a second section, the first section extendably attached to the second section; and
   a restraint system coupled to the launch platform, wherein the restraint system comprises a passive restraint for each main gear and a nose gear to indirectly restrain an aerial vehicle and configured to coordinate substantially uniform retention and release of the passive restraints in order to launch the aerial vehicle,
   wherein engagement and disengagement of the passive restraints is at least partly affected by disposition of the first section in relation to the second section,
   wherein the passive restraint for each main gear and the nose gear comprises elements to allow the main gear and the nose gear to float within a volume but not escape restraint,
   wherein the passive restraint for the nose gear further comprise a tensioned nose gear lever coupled to the second section to apply a downward force to restrain upward motion of the nose gear, and
   wherein retraction of the first and second sections retracts the tensioned nose gear lever and removes the passive restraints.

2. The aerial vehicle launching system according to claim 1,
   wherein the passive restraint for each main gear and the nose gear comprises:
   wheel chock notches coupled to the second section notch to restrain forward and downward motion of the main gear and the nose gear; and
   wheel guides coupled the second section to restrain side motion of the main gear and the nose gear,
   wherein the passive restraint for each main gear further comprises a retention rail coupled to the first section to restrain upward motion of the main gear.

3. The aerial vehicle launching system according to claim 2
wherein for the main gear, the retention rail, the wheel chock notch and the wheel guide are positioned to allow the main gear to float within a volume but not escape restraint,
wherein for the nose gear, the wheel chock notch and the wheel guide are positioned and an amount of tension on the tensioned nose gear lever allow the nose gear to float within a volume but not escape restraint,
wherein the retraction of the first and second sections simultaneously retracts the retention rails and the tensioned nose gear lever to remove the passive restraints from both the main gear and the nose gear allowing the aerial vehicle to launch when brought to a launch velocity, and
wherein retraction of the tensioned nose gear lever causes the tensioned nose gear lever to drop down to a level of the first section.

4. The aerial vehicle launching system according to claim 3, wherein the restraint system is suitably configured to substantially limit transient movement in the aerial vehicle.

5. The aerial vehicle launching system according to claim 3, wherein the restraint system is suitably configured to substantially absorb a force associated with launching the aerial vehicle, wherein absorption of the force substantially limits the aerial vehicle from experiencing the force.

6. The aerial vehicle launching system according to claim 3, further comprising a propulsion vehicle supporting the launch platform, wherein the propulsion vehicle is suitably adapted to bring the aerial vehicle to a launch velocity.

7. The aerial vehicle launching system according to claim 6, wherein the launch platform and the restraint system are suitably configured to absorb an external force transmitted from the propulsion vehicle to the aerial vehicle.

8. The aerial vehicle launching system according to claim 3, wherein the restraint system is suitably configured to restrain a plurality of aerial vehicle configurations.

9. A method for launching an aerial vehicle comprising:
providing a launch platform having a glide drawer with a first section and a second section, the first section extendably attached to the second section;
providing a restraint system coupled to the launch platform, wherein the restraint system passively restrains the aerial vehicle using a passive restraint for each main gear and a nose gear, and wherein the restraint system is configured to coordinate substantially uniform retention and retention and release of the passive restraints in order to launch the aerial vehicle;
bringing the aerial vehicle to a launch velocity; and
releasing the aerial vehicle from the restraint system by retraction of the first and second sections,
wherein the passive restraint for each main gear and the nose gear comprise elements to allow the main gear and the nose gear to float within a volume but not escape restraint,
wherein the passive restraint for the nose gear further comprises a tensioned nose gear lever coupled to the second section to apply a downward force to restrain upward motion of the nose gear, and
wherein retraction of the first and second sections retracts the tensioned nose gear lever and removes the passive restraints.

10. The method according to claim 9, wherein the passive restraint for each main gear and the nose gear comprises:
wheel chock notches coupled to the second section notch to restrain forward and downward motion of the main gear and the nose gear; and
wheel guides coupled the second section to restrain side motion of the main gear and the nose gear,
wherein the passive restraint for each main gear further comprises a retention rail coupled to the first section to restrain upward motion of the main gear.

11. The method according to claim 10 further comprising:
for the main gear, positioning of the retention rail, the wheel chock notch and the wheel guide to allow the main gear to float within a volume but not escape restraint;
for the nose gear, positioning the wheel chock notch, the wheel guide and an amount of tension on the tensioned nose gear lever to allow the nose gear to float within a volume but not escape restraint; and
retracting the first and second sections simultaneously retracts the retention rails and the tensioned nose gear lever and to remove the passive restraints from both the main gear and the nose gear allowing the aerial vehicle to launch when brought to a launch velocity,
wherein retraction of the tensioned nose gear lever causes the tensioned nose gear lever to drop down to a level of the first section.

12. The method according to claim 11, further comprising employing the restraint system to substantially absorb a force associated with launching the aerial vehicle, and wherein absorption of the force substantially limits the aerial vehicle from experiencing the force.

13. The method according to claim 11, further comprising providing a propulsion vehicle supporting the launch platform, wherein the propulsion vehicle is suitably configured to bring the aerial vehicle to a launch velocity.

14. The method according to claim 13, further comprising employing the launch platform and the restraint system to substantially absorb an external force transmitted from the propulsion vehicle to the aerial vehicle.

15. An aerial vehicle launching system comprising:
a propulsion vehicle;
a launch platform coupled to the propulsion vehicle having a glide drawer with a first section and a second section, the first section extendably attached to the second section; and
a restraint system coupled to the launch platform, wherein the restraint system comprises a passive restraint for each main gear and a nose gear to indirectly restrain an aerial vehicle and configured to coordinate substantially uniform retention and release of the passive restraints in order to launch the aerial vehicle,
wherein engagement and disengagement of the passive restraints is at least partly affected by disposition of the first section in relation to the second section,
wherein the passive restraint for each main gear and the nose gear comprise elements to allow the main gear and the nose gear to float within a volume but not escape restraint,
wherein the passive restraint for the nose gear further comprises a tensioned nose gear lever coupled to the second section to apply a downward force to restrain upward motion of the nose gear, and
wherein retraction of the first and second sections retracts the tensioned nose gear lever and removes the passive restraints.

16. The aerial vehicle launching system according to claim 15,
wherein the passive restraint for each main gear and the nose gear comprises:

wheel chock notches coupled to the second section notch to restrain forward and downward motion of the main gear and the nose gear; and wheel guides coupled the second section to restrain side motion of the main gear and the nose gear, wherein the passive restraint for each main gear further comprises a retention rail coupled to the first section to restrain upward motion of the main gear.

17. The aerial vehicle launching system according to claim 16, wherein for the main gear, the retention rail, the wheel chock notch and the wheel guide are positioned to allow the main gear to float within a volume but not escape restraint, wherein for the nose gear, the wheel chock notch and the wheel guide are positioned and an amount of tension on the tensioned nose gear lever allow the nose gear to float within a volume but not escape restraint, wherein the retraction of the first and second sections simultaneously retracts the retention rails and the tensioned nose gear lever to remove the passive restraints from both the main gear and the nose gear allowing the aerial vehicle to launch when brought to a launch velocity, and wherein retraction of the tensioned nose gear lever causes the tensioned nose gear lever to drop down to a level of the first section.

18. The aerial vehicle launching system according to claim 17, wherein the restraint system is suitably configured to substantially absorb a force associated with launching the aerial vehicle, and wherein absorption of the force substantially limits the aerial vehicle from experiencing the force.

19. The aerial vehicle launching system according to claim 17, wherein the propulsion vehicle is suitably configured to bring the aerial vehicle to a launch velocity.

20. The aerial vehicle launching system according to claim 17, wherein the launch platform and the restraint system are suitably configured to absorb an external force transmitted from the propulsion vehicle to the aerial vehicle.

21. The aerial vehicle launching system according to claim 17, wherein the restraint system is suitably configured to restrain a plurality of aerial vehicle configurations.

* * * * *

UNITED STATES PATENT AND TRADEMARK OFFICE
CERTIFICATE OF CORRECTION

PATENT NO.         : 7,665,691 B2
APPLICATION NO.    : 11/679365
DATED              : February 23, 2010
INVENTOR(S)        : Patrick T. Hanzlick et al.

It is certified that error appears in the above-identified patent and that said Letters Patent is hereby corrected as shown below:

In column 1, line 40, delete "launches" and insert -- launcher --, therefor.

In column 4, line 63, delete "check" and insert -- chock --, therefor.

In column 6, line 7, delete "restrains" and insert -- restraints --, therefor.

In column 6, line 36, delete "system," and insert -- system --, therefor.

In column 6, line 51, delete "positive restrains" and insert -- passive restraints --, therefor.

In column 6, line 52, delete "restrains" and insert -- restraints --, therefor.

In column 6, line 61, delete "110" and insert -- 100 --, therefor.

In column 6, line 64, delete "statistically" and insert -- statically --, therefor.

In column 7, line 38, delete "to" and insert -- or --, therefor.

In column 7, line 44, delete "sutiable" and insert -- suitably --, therefor.

In column 8, line 30, delete "form" and insert -- from --, therefor.

Signed and Sealed this

Twenty-seventh Day of April, 2010

David J. Kappos
*Director of the United States Patent and Trademark Office*